(12) United States Patent
Zhu et al.

(10) Patent No.: US 11,268,747 B2
(45) Date of Patent: Mar. 8, 2022

(54) REFRIGERATING AND FREEZING DEVICE

(71) Applicant: QINGDAO HAIER JOINT STOCK CO., LTD., Qingdao (CN)

(72) Inventors: Xiaobing Zhu, Qingdao (CN); Bo Jiang, Qingdao (CN); Lei Wang, Qingdao (CN); Hao Zhang, Qingdao (CN); Ming Wang, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 400 days.

(21) Appl. No.: 16/466,225

(22) PCT Filed: Dec. 1, 2017

(86) PCT No.: PCT/CN2017/114215
§ 371 (c)(1),
(2) Date: Jun. 3, 2019

(87) PCT Pub. No.: WO2018/099462
PCT Pub. Date: Jun. 7, 2018

(65) Prior Publication Data
US 2020/0072530 A1    Mar. 5, 2020

(30) Foreign Application Priority Data

Dec. 2, 2016  (CN) .......................... 201611097680.9

(51) Int. Cl.
| | | |
|---|---|---|
| *F25D 17/06* | (2006.01) |
| *A23L 3/3418* | (2006.01) |
| *B01D 53/22* | (2006.01) |
| *F25D 11/02* | (2006.01) |
| *F25D 25/02* | (2006.01) |

(52) U.S. Cl.
CPC .......... *F25D 17/062* (2013.01); *A23L 3/3418* (2013.01); *B01D 53/228* (2013.01); *F25D 11/02* (2013.01); *F25D 25/025* (2013.01); *A23V 2002/00* (2013.01); *F25D 2317/04* (2013.01); *F25D 2317/061* (2013.01)

(58) Field of Classification Search
CPC combination set(s) only.
See application file for complete search history.

(56) References Cited

FOREIGN PATENT DOCUMENTS

| | | | | |
|---|---|---|---|---|
| CN | 2919144 Y | * | 3/2006 | |
| CN | 291944 Y | * | 7/2007 | |
| CN | 101544356 A | | 9/2009 | |
| CN | 101766321 A | * | 7/2010 | |
| CN | 101766321 A | | 7/2010 | |
| CN | 106524644 A | | 3/2017 | |
| CN | 206291582 U | | 6/2017 | |
| JP | H5-227881 A | | 9/1993 | |
| JP | 2004360948 A | * | 12/2004 | ........... F25D 17/042 |
| KR | 10-2012-0049565 A | | 5/2012 | |

* cited by examiner

*Primary Examiner* — Emmanuel E Duke
(74) *Attorney, Agent, or Firm* — Cheng-Ju Chiang

(57) ABSTRACT

Provided is a refrigerating and freezing device comprising a storage space, a compressor chamber, an air-regulating membrane component, and a suction pump disposed in the compressor chamber. The provided refrigerating and freezing device has a favorable freshness preservation effect, fully utilizing the space in the compressor chamber without using the storage space.

10 Claims, 6 Drawing Sheets

REFRIGERATING AND FREEZING DEVICE

The present application is a 35 U.S.C. § 371 National Phase conversion of International (PCT) Patent Application No. PCT/CN2017/114215, filed on Dec. 1, 2017, which claims the priority to the Chinese Patent Application No. 201611097680.9, filed on Dec. 2, 2016, and titled "Refrigerating and Freezing Device", which is incorporated herein by reference in its entirety. The PCT International Patent Application was filed and published in Chinese.

TECHNICAL FIELD

The present invention relates to the field of refrigerator storage technology, and in particular, to a refrigerating and freezing device.

BACKGROUND

The refrigerator is a kind of refrigeration equipment capable of keeping a constant low temperature, and is also a civilian product that keeps foods or other items at a constant low-temperature cold state. With the improvement in the life quality, the consumers' demand on fresh keeping of the stored foods is also growing, especially the demand on the color and taste of the foods. Thus, the stored foods shall be guaranteed to keep their color, taste, freshness or the like as unchanged as possible during the storage. At present, only the vacuum freshness-keeping is available on the market for effectively storing the foods, and a vacuum freshness-keeping bag and a vacuum freshness-keeping storing chamber are two customary vacuum freshness-keeping manners.

Regarding the vacuum freshness-keeping bag, the consumers need to carry out vacuuming every time when they store food, and thus, the bag is not enjoyed by the consumers due to the troublesome operation.

Regarding the vacuum freshness-keeping storing chamber, since the cabinet or the like is of a rigid structure, the requirements on the vacuum system and the sealing performance of the refrigerator are very high in order to keep a vacuum state. Each time an item is put or taken, a large quantity of air is poured in, causing the energy consumption to be rather high. In addition, under a vacuum condition, it is difficult for the food to receive refrigeration, which is particularly unfavorable for the storage of food. Furthermore, it takes a lot of effort for the user to open the refrigerator door every time under the vacuum environment, causing inconvenience to the user. Although the vacuum storage chamber of some refrigerators can be ventilated through a vacuum system, the user may need to wait for a longer time, thereby having a poor timeliness. The long vacuum time may also cause serious deformation of the refrigerator cabinet. That is, the existing refrigerator with a vacuum structure cannot well complete the vacuum fresh keeping, and its requirement on strength of the cabinet is high, thereby having a high implementation requirement and a high cost.

Moreover, the inventor founds that due to the large size and high cost of traditional nitrogen-manufacturing equipment for air conditioning and fresh keeping, the technology is basically limited to be used on various large professional storages (the storage capacity is generally at least 30 tons). That is, what kind of appropriate air conditioning technology and a corresponding equipment shall be adopted to miniaturize and mute the air-conditioning system economically to make it adaptable for the home or individual users is a technical problem that has been eager to solve but has not been successfully solved by technicians in the air-conditioning and freshness-keeping field.

SUMMARY

An object of the present invention is to overcome at least one deficiency of the existing refrigerator by providing a refrigerating and freezing device. The present invention creatively proposes to discharge oxygen in the air from the air-conditioning and freshness-keeping space, so as to obtain a gas atmosphere that is rich in nitrogen but poor in oxygen to facilitate fresh keeping of the food. The gas atmosphere may reduce the content of oxygen in a fruit and vegetable storage space, reduce the aerobic respiration intensity of the fruit and vegetable, and meanwhile ensure the basic respiration, thereby preventing the anaerobic respiration of the fruit and vegetable and achieving the object in keeping freshness of the fruit and vegetable for a long term.

A further object of the present invention is to make full use of a compressor chamber space and a storage space of the refrigerating and freezing device, so as to cause the refrigerating and freezing device to be compact in structure and energy-efficient.

In order to achieve at least one of the above objects, the present invention provides a refrigerating and freezing device, comprising:

a cabinet, in which a storage space and a compressor chamber are defined, the storage space being provided therein with a storage container that has an air-conditioning and freshness-keeping space;

an air-regulating membrane component which has at least one air-conditioning membrane and one oxygen-rich gas collecting cavity with a surrounding space communicated with the air-conditioning and freshness-keeping space, and which is configured to enable more oxygen than nitrogen in the surrounding space of the air-regulating membrane component to enter into the oxygen-rich gas collecting cavity through the air-conditioning membrane; and a suction pump, provided in the compressor chamber, wherein an inlet end of the suction pump is communicated with the oxygen-rich gas collecting cavity of the air-regulating membrane component through a pipeline to pump the gas penetrating into the oxygen-rich gas collecting cavity out the storage container.

Optionally, the storage container is a drawer assembly, comprising:

a drawer cartridge, having a forward opening and provided in the storage space; and a drawer body, slidably mounted in the drawer cartridge to be operatively withdrawn from and inserted into the drawer cartridge from the forward opening of the drawer cartridge.

Optionally, a plurality of air pressure balancing holes is defined in the drawer cartridge, and the storage space is communicated with the air-conditioning and freshness-keeping space through the plurality of air pressure balancing holes.

Optionally, an accommodating cavity communicated with the air-conditioning and freshness-keeping space is provided in a top wall of the drawer cartridge to accommodate the air-regulating membrane component.

Optionally, at least one first vent hole and at least one second vent hole spaced apart from the at least one first vent hole are defined in a wall surface between the accommodating cavity in the top wall of the drawer cartridge and the air-conditioning and freshness-keeping space, so as to respectively communicate the accommodating cavity and the air-conditioning and freshness-keeping space in different positions. The refrigerating and freezing device further comprises a fan provided in the accommodating cavity to draw the gas in the air-conditioning and freshness-keeping space to be returned to the air-conditioning and freshness-keeping space sequentially passing through the at least one first vent, the accommodating cavity and the at least one second vent.

Optionally, the compressor chamber extends in a lateral direction of the cabinet, and the suction pump is provided at one end of the compressor chamber.

Optionally, the storage space is a refrigerating space; the cabinet further defines a freezing space that is provided below the storage space and a temperature changing space that is provided between the freezing space and the refrigerating space.

The compressor chamber is provided behind and below the freezing space.

Optionally, the pipeline comprises a vertical pipe section provided behind the storage space.

Optionally, the refrigerating and freezing device further comprises:

a mounting bottom plate, mounted on a bottom surface of the compressor chamber by a plurality of vibration-damping footpads; and a sealing case, mounted on the mounting bottom plate, wherein the suction pump is mounted in the sealing case.

Optionally, the air-regulating membrane component further comprises a support frame comprising a first surface and a second surface parallel to each other; and the support frame is formed with a plurality of airflow passages that extend on the first surface, extend on the second surface, and penetrate through the support frame to communicate the first surface and the second surface, the plurality of airflow passages jointly forming the oxygen-rich gas collecting cavity.

The at least one air-conditioning membrane may be two planar air-conditioning membranes respectively laid on the first surface and the second surface of the support frame.

Since the refrigerating and freezing device of the present invention has an air-conditioning membrane module and a suction pump and the suction pump may cause the pressure on one side of the air-conditioning membrane to be smaller than that on the other side thereof, a gas atmosphere that is rich in nitrogen but poor in oxygen is formed in the air-conditioning and freshness-keeping space to facilitate fresh keeping of the food. The gas atmosphere may reduce the content of oxygen in a fruit and vegetable storage space, reduce the aerobic respiration intensity of the fruit and vegetable, and meanwhile ensure the basic respiration, which prevents the anaerobic respiration of the fruit and vegetable and achieves the object in keeping freshness of the fruit and vegetable for a long term.

Furthermore, since the suction pump in the refrigerating and freezing device of the present invention is provided in the compressor chamber, the space of the compressor chamber can be fully utilized without the need to occupy other places, especially the storage space. Therefore, the volume of the refrigerating and freezing device will not be increased additionally, which makes the refrigerating and freezing device have a compact structure.

Furthermore, the refrigerating and freezing device of the present invention not only has a good freshness-keeping effect, but also has a low requirement on rigidity and strength of the storage container or the like, thereby having a low implementation requirement and a low cost. In addition, the refrigerating and freezing device of the present invention well solves the above technical problem that has been eager to solve but has not been successfully solved by technicians in the air-conditioning and freshness-keeping field. The refrigerating and freezing device of the present invention is not only small in size but also low in noise, thereby being particularly suitable for home and individual use.

Furthermore, the refrigerating and freezing device of the present invention is preferably a household refrigerator, such as, a compression-type direct-cooling household refrigerator, or a compression-type air-cooled household refrigerator.

A person skilled in the art may better understand the above and other objects, advantages and features of the present invention from the following detailed description of specific embodiments of the present invention with reference to the drawings below.

BRIEF DESCRIPTION OF THE DRAWINGS

Some specific embodiments of the present invention will be described in detail below in an exemplary manner rather than a restrictive manner with reference to the drawings. The same reference sign in the drawings indicates the same or similar elements or parts. A person skilled in the art shall know that these drawings are not necessarily drawn to scale. In the drawings.

DETAILED DESCRIPTION OF PREFERRED EMBODIMENTS

Figure 1:
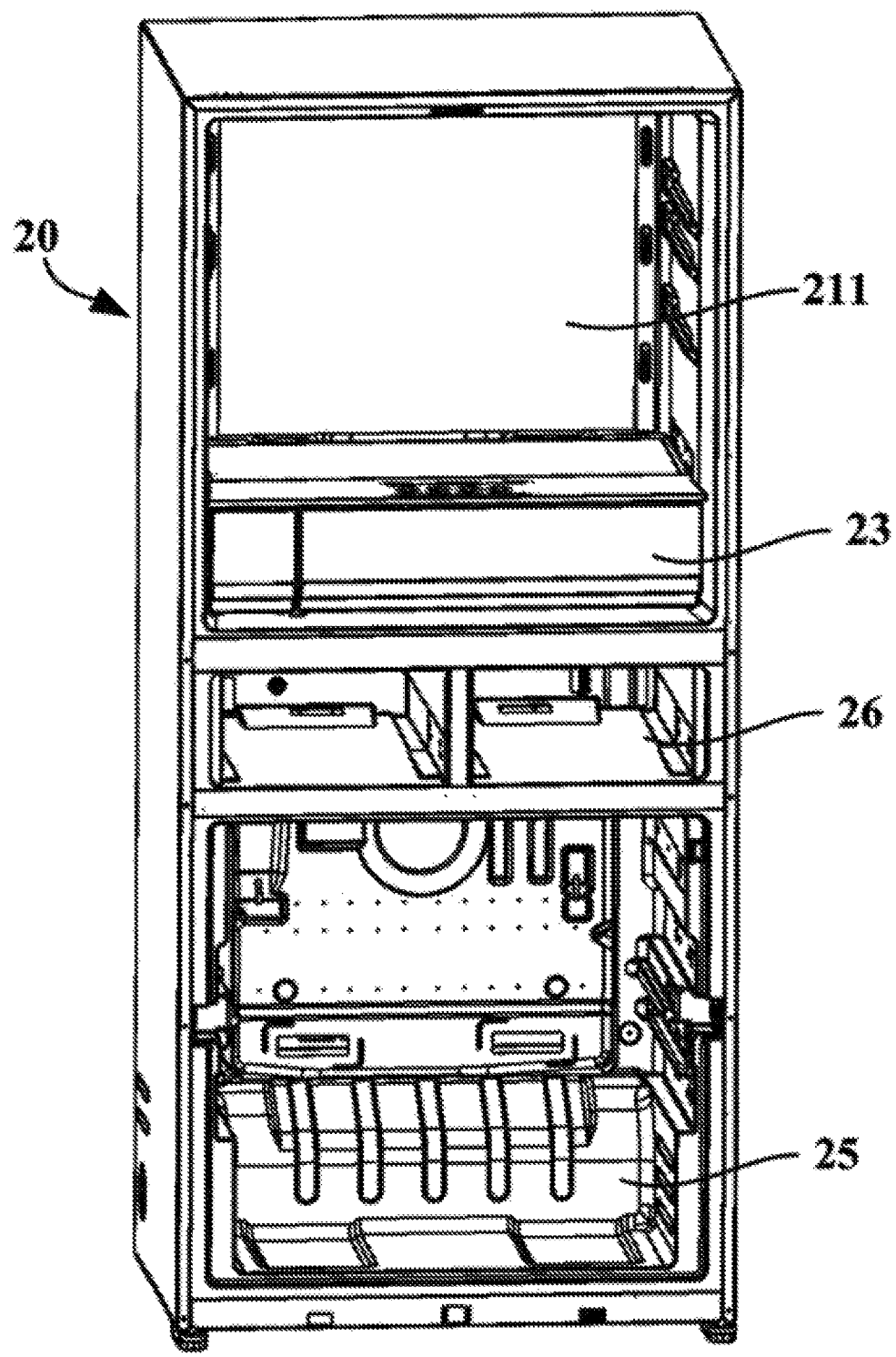
FIG. 1 is a schematically partial structure view of a refrigerating and freezing device according to an embodiment of the present invention.
Figure 2:
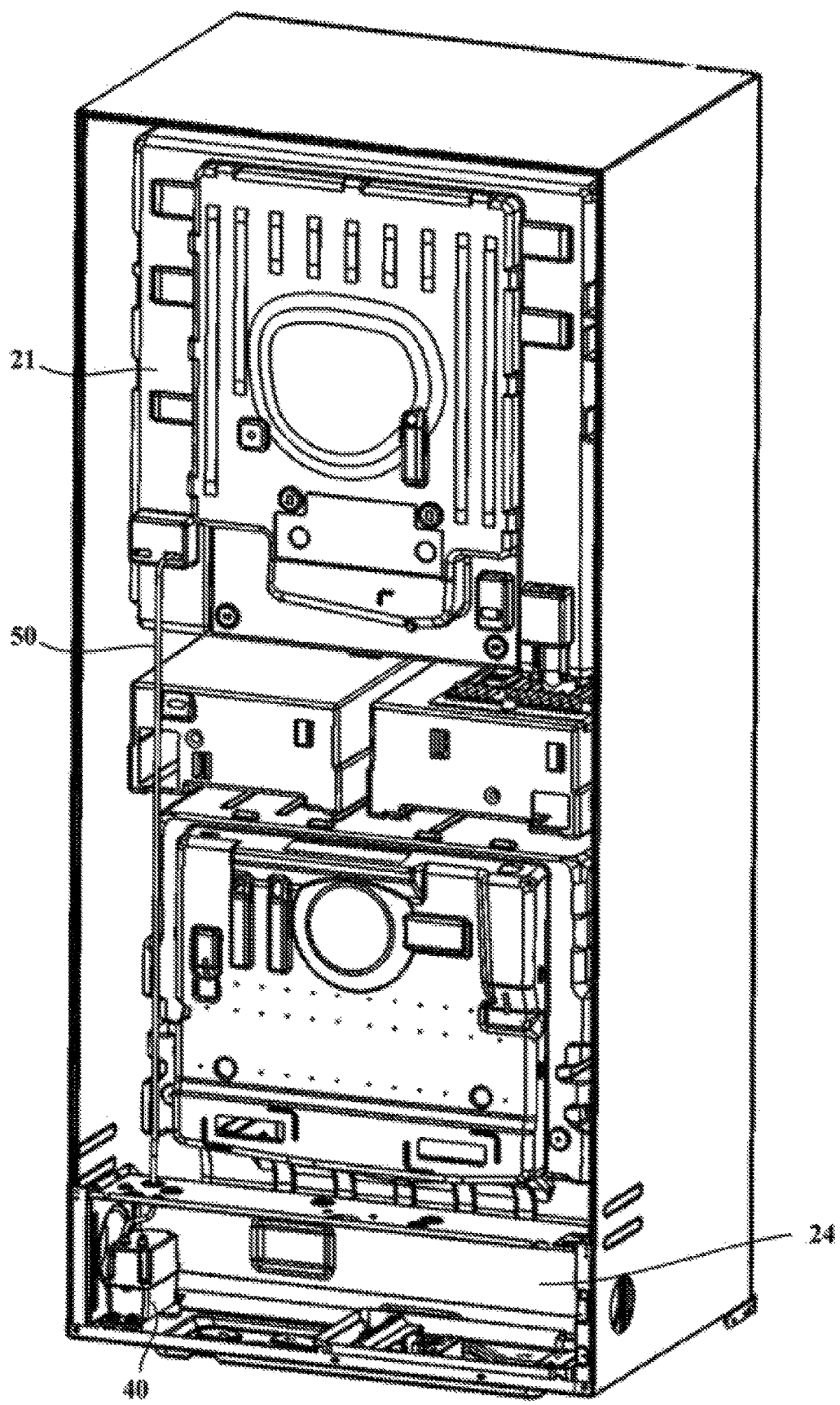
FIG. 2 is a schematically structural view of the structure shown in FIG. 1 from another perspective.

FIG. 1 is a schematically structural view of a refrigerating and freezing device according to an embodiment of the present invention, and FIG. 2 is a schematically structural view of the structure shown in FIG. 1 from another perspective. As shown in FIGS. 1 and 2, the embodiment of the present invention provides a refrigerating and freezing device, which comprises a cabinet 20, a main door, an air-regulating membrane component 30, a suction pump 41, and a refrigeration system.

The cabinet 20 defines a storage space 211 and a compressor chamber 24 therein. For example, the cabinet 20 may comprise an inner casing 21 that defines a storage space 211 therein. The main door may be composed of two opposite doors that are rotatably mounted to the cabinet 20 and that are configured to open or close the storage space 211 defined by the cabinet 20. Optionally, the main door may also be one door. Furthermore, the storage space 211 is provided with a storage container that has an air-conditioning and freshness-keeping space. The air-conditioning and freshness-keeping space may be a closed space or an approximately closed space. Preferably, the storage container is a drawer assembly. The storage container may comprise a drawer cartridge 22 and a drawer body 23. The drawer cartridge may have a forward opening, and is provided in the storage space 211, specifically in the lower portion of the storage space 211. As known by a person skilled in the art, the drawer cartridge 22 may also be provided in the middle or upper portion of the storage space 211. The drawer body 23 may be slidably mounted in the drawer cartridge 22 to be operatively withdrawn from and inserted into the drawer cartridge 22 from the forward opening of the drawer cartridge 22. The drawer body 23 may have a drawer cover that may cooperate with the opening of the drawer cartridge 22 to seal the air-conditioning and freshness-keeping space. In some alternative embodiments, the storage container may comprise a cartridge and a small door configured to open or close the cartridge.

The refrigeration system may be a refrigeration circulation system composed of a compressor, a condenser, a throttle device, an evaporator, and the like. The compressor is mounted in the compressor chamber 24. The evaporator is configured to provide refrigeration directly or indirectly into the storage space 211. For example, if the refrigerating and freezing device is a compression-type direct-cooling household refrigerator, the evaporator may be provided outside or inside the rear wall surface of the inner casing 21. If the refrigerating and freezing device is a compression-type air-cooled household refrigerator, the cabinet 20 is further provided with an evaporator chamber that is communicated with the storage space 211 via an air passage system; the evaporator chamber is provided with an evaporator therein; and a fan is provided at the outlet of the evaporator chamber to circulate refrigeration to the storage space 211.

The air-regulating membrane component 30 has at least one air-conditioning membrane 31 and one oxygen-rich gas collecting cavity with a surrounding space communicated with the air-conditioning and freshness-keeping space. The air-regulating membrane component 30 is configured to enable more oxygen than nitrogen in the surrounding space of the air-regulating membrane component 30 to enter the oxygen-rich gas collecting cavity through the air-conditioning membrane 31. Specifically, the inner side surface of each air-conditioning membrane 31 faces the oxygen-rich gas collecting cavity to allow more oxygen than nitrogen in the air in the outer space of the air-regulating membrane component 30 to enter the oxygen-rich gas collecting cavity through the at least one air-conditioning membrane 31 when the pressure of the oxygen-rich gas collecting cavity is less than that of the surrounding space of the air-regulating membrane component 30.

The suction pump 41 is also provided in the compressor chamber 24, and the inlet end of the suction pump 41 is communicated with the oxygen-rich gas collecting cavity of the air-regulating membrane component 30 via a pipeline 50 to pump the air penetrating into the oxygen-rich gas collecting cavity out the storage container.

In this embodiment, the suction pump 41 draws air outward to cause the pressure of the oxygen-rich gas collecting cavity less than that of the surrounding space of the air-regulating membrane component 30, which may further cause the oxygen in the surrounding space of the air-regulating membrane component 30 to enter the oxygen-rich gas collecting cavity. Since the air-conditioning and freshness-keeping space is in communication with the surrounding space of the air-regulating membrane component 30, the air in the air-conditioning and freshness-keeping space may enter the surrounding space of the air-regulating membrane component 30, which may cause the oxygen in the air in the air-conditioning and freshness-keeping space to enter the oxygen-rich gas collecting cavity, thereby obtaining a gas atmosphere that is rich in nitrogen but poor in oxygen to facilitate fresh keeping of the food in the air-conditioning and freshness-keeping space.

The refrigerating and freezing device of the present invention may form a gas atmosphere that is rich in nitrogen but poor in oxygen in the air-conditioning and freshness-keeping space to facilitate freshness-keeping of the food; and the gas atmosphere may reduce the content of oxygen in a fruit and vegetable storage space, reduce the aerobic respiration intensity of the fruit and vegetable, and meanwhile ensure the basic respiration, which prevents the anaerobic respiration of the fruit and vegetable and achieves the object in keeping freshness of the fruit and vegetable for a long term. Moreover, the gas atmosphere also has a large amount of gases such as nitrogen, so that the refrigeration efficiency of items in the air-conditioning and freshness-keeping space cannot be reduced, and thus, the fruit and vegetable can be stored effectively. The suction pump 41 is provided in the compressor chamber 24, thus, the space of the compressor chamber 24 can be fully utilized without the need to occupy other places. Therefore, the volume of the refrigerating and freezing device will not be increased additionally, which makes the refrigerating and freezing device have a compact structure. In addition, the refrigerating and freezing device has a low requirement on rigidity and strength of the cabinet 20, which thereby has a low implementation requirement and a low cost. The refrigerating and freezing device of the present invention well solves the above technical problem that has been eager to solve but has not been successfully solved by technicians in the air-conditioning and freshness-keeping field. The refrigerating and freezing device of the present invention is not only small in size but also low in noise, thereby being particularly suitable for home and individual use.

In some embodiments of the present invention, the drawer cartridge 22 may be provided with a plurality of micro-holes that are used to communicate the storage space 211 and the air-conditioning and freshness-keeping space. The micro-holes are also called air pressure balancing holes. Each micro-hole may be a micro-hole in a millimeter level, for example, may have a diameter from 0.1 mm to 3 mm, preferably 1 mm, 1.5 mm, etc. By providing a plurality of micro-holes, the pressure in the air-conditioning and freshness-keeping space can be maintained not too low, and the nitrogen in the air-conditioning and freshness-keeping space can be prevented from flowing to the large storage space 211, and even if there is some flow, it is small or even negligible, so that the storage of the foods in the drawer space will not be adversely affected. In some optional embodiments of the present invention, the micro-holes may not be provided on the drawer cartridge 22. Even so, a large amount of gases such as nitrogen may be present in the air-conditioning and freshness-keeping space, and the user does not need much effort to open the drawer body 23, thereby saving a lot effort compared with an existing vacuum storage chamber.

In some embodiments of the present invention, the storage space 211 is a refrigerating space having a storage temperature generally between 2° C. and 10° C., preferably between 3° C. and 8° C. Furthermore, the cabinet 20 further defines a freezing space 25 that is provided below the storage space 211 and a temperature changing space 26 that is provided between the freezing space 25 and the refrigerating space. The temperature of the freezing space 25 is generally in the range of −14° C. to −22° C. The temperature changing space 26 can be adjusted according to needs, so as to store suitable foods. The compressor chamber 24 is preferably provided behind and below the freezing space 25. In some alternative embodiments of the present invention, the storage space 211 may also be a freezing space or a temperature changing space. That is, the temperature range of the storage space 211 may be controlled from −14° C. to −22° C. or adjusted according to needs. Furthermore, the relative positions between the refrigerating space, the freezing space and the temperature changing space can be adjusted according to actual needs.

In some embodiments of the present invention, the compressor chamber 24 extends in the lateral direction of the cabinet 20, and the suction pump 41 is provided at one end of the compressor chamber 24 in the lateral direction. The compressor may be provided at the other end of the compressor chamber 24 in the lateral direction, so that the distance between the suction pump 41 and the compressor is relatively large, thereby reducing the superposition of noise and waste heat. For example, the suction pump 41 may be provided at one end of the compressor chamber 24 adjacent to the pivoting side of the main door. If the refrigerating and freezing device is a side-by-side refrigerator, the suction pump 41 may be provided at either end of the compressor chamber 24. In other embodiments of the present invention, the suction pump 41 is adjacent to the compressor at one end of the compressor chamber 24 and located between the compressor and the side wall of the compressor chamber 24.

Figure 3:
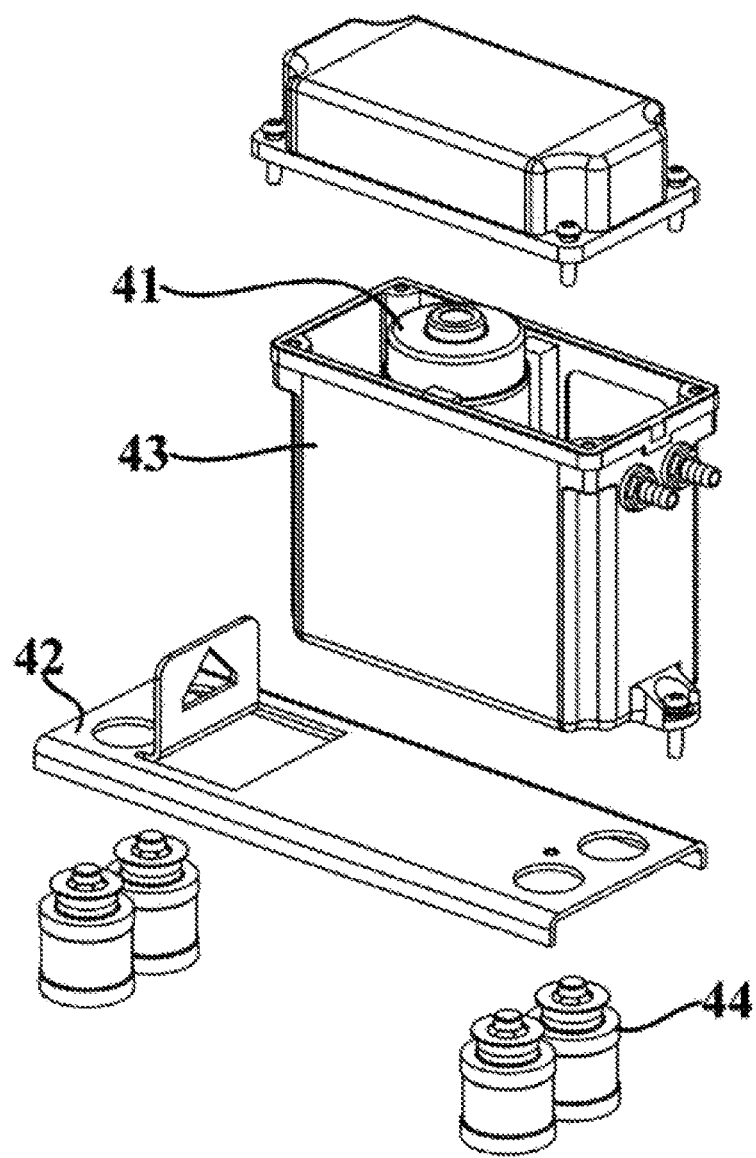
FIG. 3 is a schematically exploded view of a suction pump assembly in a refrigerating and freezing device according to an embodiment of the present invention.

FIG. 3 is a schematically exploded view of a suction pump of a refrigerating and freezing device according to an embodiment of the present invention. As shown in FIG. 3, in some embodiments of the present invention, the refrigerating and freezing device may further comprise a mounting bottom plate 42 and a sealing case 43. The mounting bottom plate 42 may be mounted on a bottom surface of the compressor chamber 24 by a plurality of vibration-damping footpads 44. The sealing case 43 is mounted on the mounting bottom plate 42. The suction pump 41 is mounted in the sealing case 43. That is, the suction pump 41 may be provided inside one sealing case 43, and the sealing case 43 may be mounted in the compressor chamber 24 by the mounting bottom plate 42. The sealing case 43, the mounting bottom plate 42, and the suction pump 41 may also be called a suction pump assembly 40. When the suction pump 41 is in operation, the sealing case 43 may block the noise and/or waste heat from spreading outward to a great extent. Furthermore, in order to improve the effect in reducing noise and vibration, a plurality of vibration-damping footpads 44 (which may be made of rubber) may be mounted on the mounting bottom plate 42. The number of the vibration-damping footpads 44 is preferably four, and the four vibration-damping footpads 44 are mounted in footpad mounting holes defined at four corners of the mounting bottom plate 42.

In some embodiments of the present invention, the sealing case 43 is internally provided with a mounting frame. The mounting frame is connected to the inner wall of the sealing case 43 by a plurality of vibration-damping footpads, and the suction pump 41 is fixed inside the mounting frame to reduce the vibration and noise generated in operation of the suction pump 41. Particularly, two vibration-damping footpads are provided at the bottom of the mounting frame, and the vibration-damping footpads sleeve positioning pillars on the bottom surface of the sealing case 43. A circular vibration-damping footpad is provided on each of the two opposite sides of the mounting frame, and is engaged in a slot of the corresponding side wall of the sealing case 43. Each of the other opposite sides of the mounting frame is fixed with a vibration-damping footpad. The suction pump 41 may be located between respective vibration-damping footpads within the sealing case 43 and fixed to the mounting frame by screws.

Figure 4:
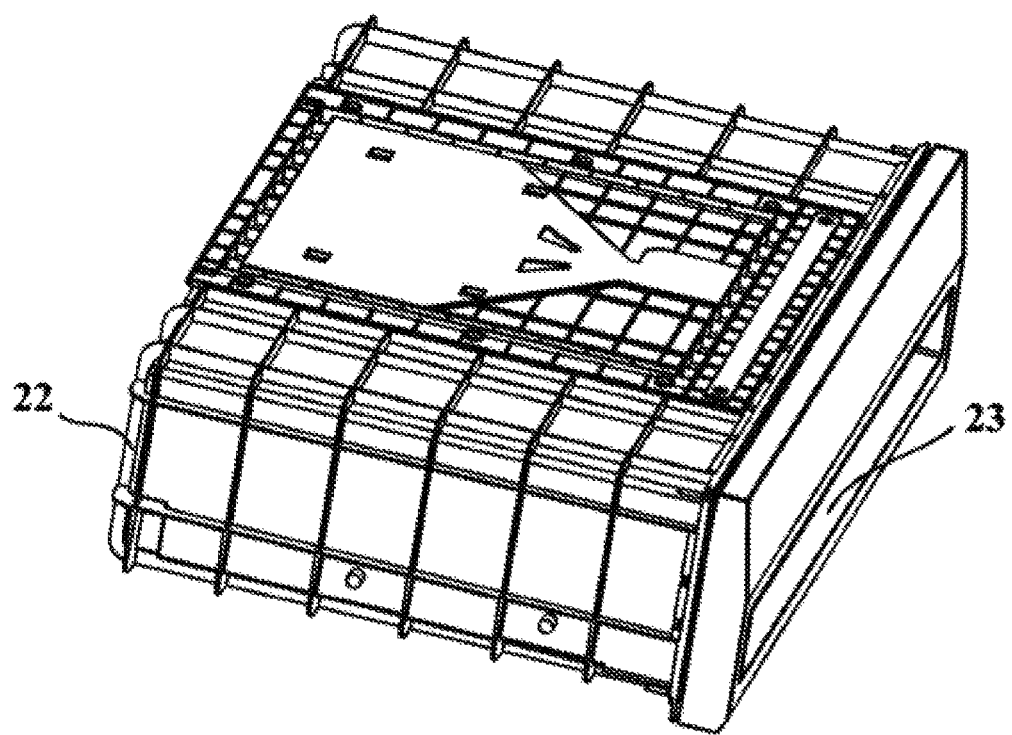
FIG. 4 is a schematically partial structure view of a refrigerating and freezing device according to an embodiment of the present invention.
Figure 5:
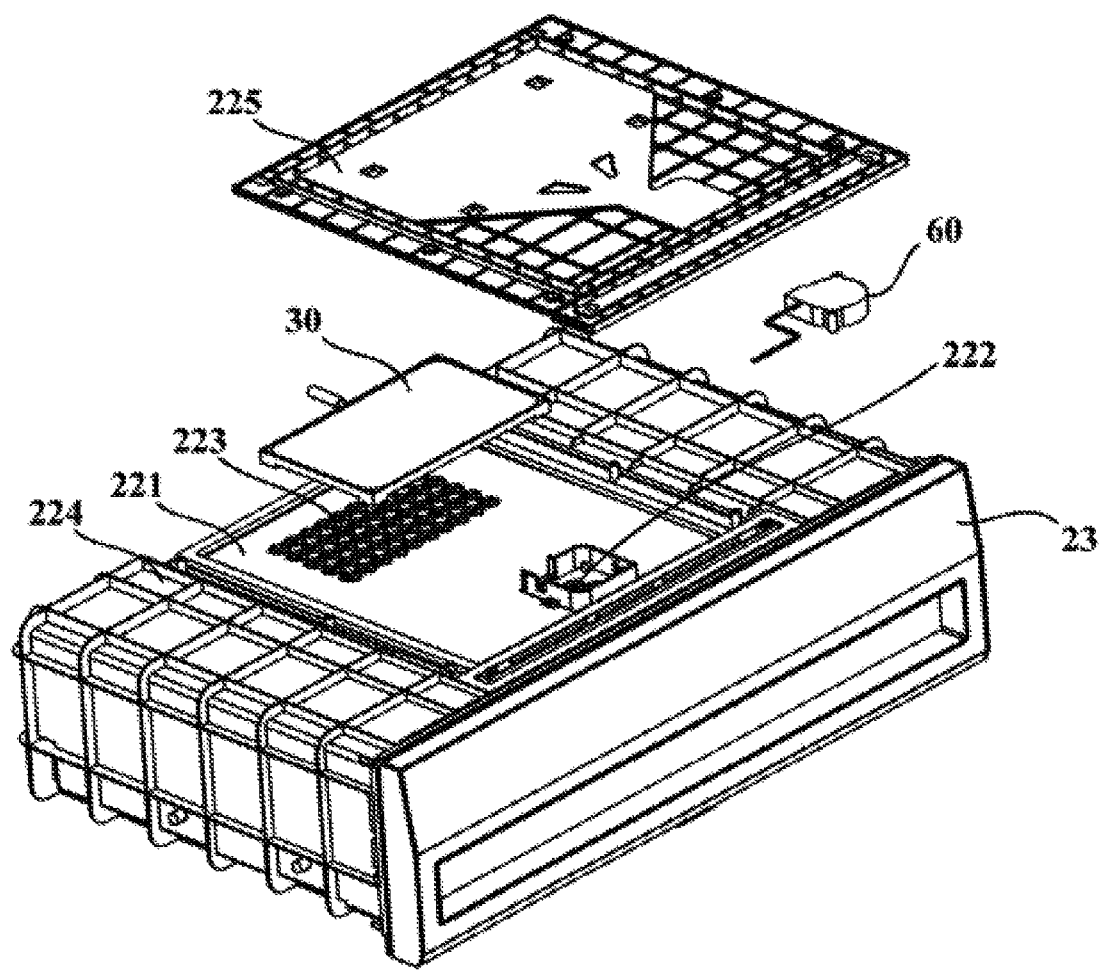
FIG. 5 is a schematically exploded view of the structure shown in FIG. 4.

In some embodiments of the present invention, as shown in FIGS. 4 and 5, the air-regulating membrane component 30 may be provided on the cartridge wall of the drawer cartridge 22. The air-regulating membrane component 30 may be of a plate shape, and may preferably be provided horizontally on the top wall of the drawer cartridge 22. Particularly, the accommodating cavity 221 is provided in the top wall of the drawer cartridge 22 to accommodate the air-regulating membrane component 30. For example, at least one first vent hole 222 and at least one second vent hole 223 are defined in a wall surface between the accommodating cavity in the top wall of the drawer cartridge 22 and the air-conditioning and freshness-keeping space. The at least one first vent hole 222 and the at least one second vent hole 223 are spaced from each other to respectively communicate the accommodating cavity and the air-conditioning and freshness-keeping space in different positions. The first vent hole 222 and the second vent hole 223 are both small holes, and the number of each can be multiple. In some alternative embodiments, the top wall of the drawer cartridge 22 has a recessed groove in its inner side. The air-regulating membrane component 30 may be provided in the recessed groove at the top wall of the drawer cartridge 22.

The pipeline 50 may comprise a vertical pipe section that extends vertically. The vertical pipe section is provided behind the storage space 211; and the vertical pipe section has its lower end communicated with the inlet of the suction pump 41, and its upper side communicated with the oxygen-rich gas collecting cavity of the air-regulating membrane component 30. The vertical pipe section may be provided adjacent to the side shell and the backboard of the cabinet 20, and may be sleeved by a heat insulating sleeve or a heat insulating tube, which may prevent the refrigeration in the oxygen in the vertical pipe section from being transmitted to the side shell and the backboard, thereby preventing the generation of condensation.

In some embodiments of the present invention, in order to facilitate the flow of air in the air-conditioning and freshness-keeping space and the accommodating cavity 221, the refrigerating and freezing device may further comprise a fan 60 that may be provided in the accommodating cavity and configured to drive the air in the air-conditioning and freshness-keeping space to enter the accommodating cavity 221 via the first vent hole 222, and the air in the accommodating cavity 221 to enter the air-conditioning and freshness-keeping space via the second vent hole 223. That is, the fan 60 may drive the air in the air-conditioning and freshness-keeping space to be returned to the air-conditioning and freshness-keeping space sequentially passing through the at least one first vent hole 222, the accommodating cavity and the at least one second vent hole 223.

The fan 60 is preferably a centrifugal fan provided at the first vent hole 222 in the accommodating cavity 221. That is, the centrifugal fan is located above the at least one first vent hole 222; the axis of rotation is vertically downward; and the air inlet just faces the first vent hole 222. The air outlet of the centrifugal fan may face the air-regulating membrane component 30. The air-regulating membrane component 30 is provided above the at least one second vent hole 223, so that each air-conditioning membrane of the air-regulating membrane component 30 is parallel to the top wall of the drawer cartridge 22. At least one first vent hole 222 is provided at a front portion of the top wall, and at least one second vent hole 223 is provided at a rear portion of the top wall. That is, the centrifugal fan is provided at the front portion of the accommodating cavity 221, and the air-regulating membrane component 30 is provided at the rear portion of the accommodating cavity 221. Furthermore, the top wall of the drawer cartridge 22 comprises a main plate portion 224 and a cover portion 225. A recessed portion is formed in a partial area of the main plate portion 224, and the cover portion 225 is detachably covered on the recess portion to form the accommodating cavity 221. In order to facilitate the manufacture of the drawer cartridge 22, the main plate portion 224 can be integrally formed with the side wall, the bottom wall and the rear wall of the drawer cartridge 22.

Figure 6:
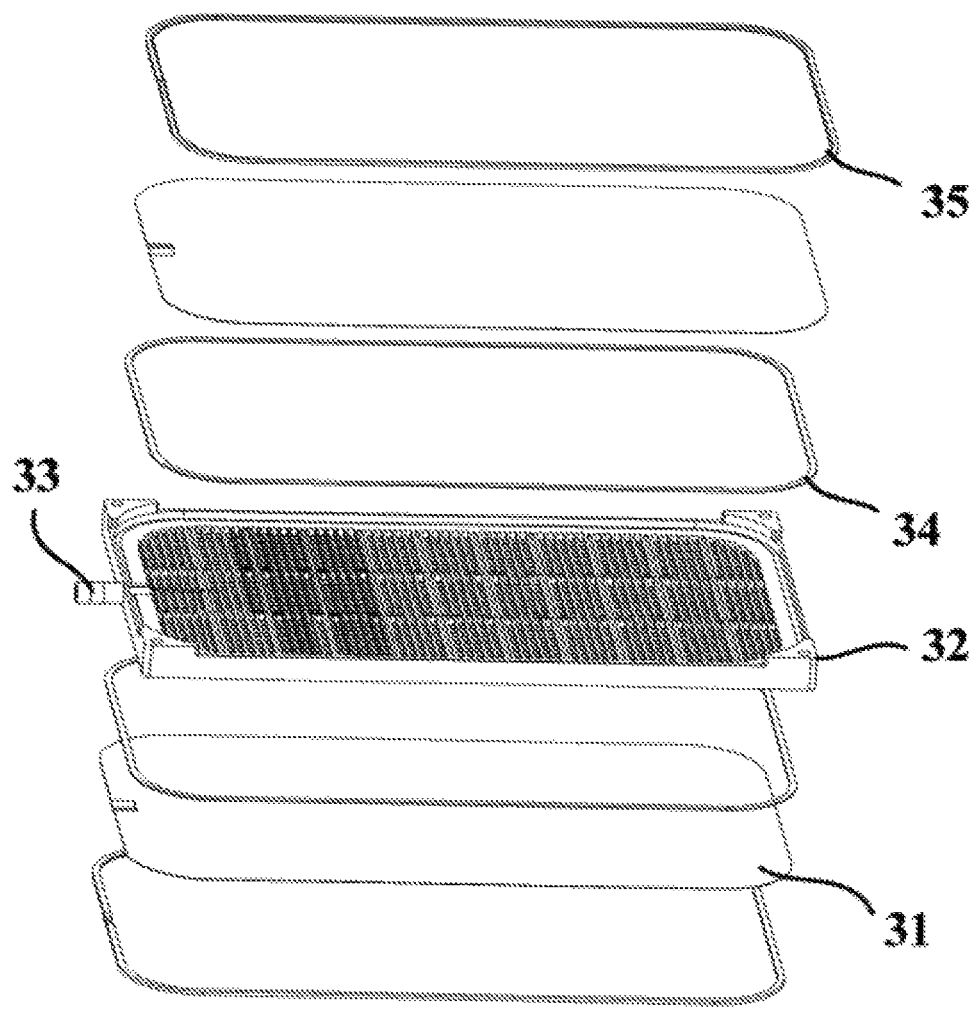
FIG. 6 is a schematically exploded view of an air-regulating membrane component of a refrigerating and freezing device according to an embodiment of the present invention.

In some embodiments of the present invention, as shown in FIG. 6, the air-regulating membrane component 30 may be of a plate shape, and may comprise a support frame 32. The air-conditioning membrane 31 is preferably an oxygen-rich membrane. There may be two air-conditioning membranes 31 mounted on both sides of the support frame 32 respectively, so that the two air-conditioning membranes 31 form the oxygen-rich gas collecting cavity together with the support frame 32. Furthermore, the support frame 32 may comprise structures, such as, a frame, a rib and/or a plate or the like, provided in the frame; an airflow passage may be formed between the ribs or between the rib and the plate; and a groove may be formed on a surface of the rib and a surface of the plate to form an airflow passage. The rib and/or plate may increase the structural strength and the like of the air-regulating membrane component 30. That is, the support frame 32 comprises a first surface and a second surface that are parallel to each other, and the support frame 32 is formed with a plurality of airflow passages that extends on the first surface, extends on the second surface, and penetrates through the support frame 32 to communicate the first surface and the second surface, the plurality of airflow passages jointly forming the oxygen-rich gas collecting cavity. The at least one air-conditioning membrane 32 may be two planar air-conditioning membranes laid on the first surface and the second surface of the support frame 32, respectively.

In some embodiments of the present invention, the support frame 32 comprises a suction hole 33 communicated with the at least one airflow passage, and is provided on the frame to allow output of the oxygen in the oxygen-rich gas collecting cavity. The suction hole 33 is communicated with the suction pump 41. The suction hole 33 may be provided on a long or short edge of the frame, which may be determined according to the orientation of the air-regulating membrane component 30 or actual needs in design. For example, in the embodiment shown in FIGS. 4 and 5, the suction hole 33 may be formed in the long edge of the frame. The air-conditioning membrane 31 is firstly mounted on the frame by a double-sided tape 34, and then sealed by a sealant 35.

In some embodiments, the support frame 32 may comprise a frame, a plurality of first ribs, and a plurality of second ribs. The plurality of first ribs is provided in the frame by being spaced apart from each other in the longitudinal direction and extending in the lateral direction, and a side surface of the plurality of first ribs forms a first surface. The plurality of second ribs is provided on the other side surface of the plurality of first ribs by being spaced apart from each other in the lateral direction and extending in the longitudinal direction, and a side surface of the plurality of second ribs away from the first ribs forms a second surface. The support frame 32 of the present invention is provided with a plurality of first ribs that are provided in the frame by being spaced apart from each other in the longitudinal direction and extending in the lateral direction and a plurality of second ribs that are provided on the other side surface of the plurality of first ribs by being spaced apart from each other in the lateral direction and extending in the longitudinal direction. In this way, the continuity of the airflow passage can be ensured on one hand, and on the other hand the volume of the support frame 32 can be greatly reduced, thereby enhancing the strength of the support frame 32. Furthermore, the support frame 32 having the above structure ensures sufficient support for the air-conditioning membrane 31, so that the flatness can be maintained at all times even if the internal pressure of the oxygen-rich gas collecting cavity is large, thereby ensuring the service life of the air-regulating membrane component 30.

In a further embodiment, the plurality of first ribs may comprise a plurality of first narrow ribs and a plurality of first wide ribs. The plurality of first wide ribs is spaced apart from each other, and the plurality of first narrow ribs is provided between two adjacent first wide ribs. The plurality of second ribs may comprise a plurality of second narrow ribs and a plurality of second wide ribs, wherein the plurality of second wide ribs is spaced apart from each other, and the plurality of the second wide ribs is provided between two adjacent second narrow ribs. A person skilled in the art may easily understand that the "wide" and "narrow" herein are comparative terms.

In some embodiments, each of the first wide ribs is recessed inwardly from a side surface on which the first surface is formed to form a first trench, and each of the second wide ribs is recessed inwardly from a side surface on which the second surface is formed to form a second trench, so as to improve the communication of the internal grid structure on the premise that the thickness (or volume) of the support frame 32 is smaller.

In a further embodiment, a partial surface of each of the first wide ribs away from the first surface extends toward the second ribs to be flush with the second surface, and each of the first wide ribs is recessed inwardly from the partial surface that is flush with the second surface to form a third trench. The third trench and the second trench are communicated at the intersection therebetween to form a cross trench. A partial surface of at least one second wide rib among the plurality of second wide ribs away from the second surface extends toward the first ribs to be flush with the first surface, and the at least one second wide rib is recessed inwardly from the partial surface that is flush with the first surface to form a fourth trench. The fourth trench and the third trench are communicated at the intersection therebetween to form a cross trench.

In some embodiments of the present invention, in order to facilitate flow of the airflow, a plurality of air guiding ribs may be extended downwardly from the inner surface of the cover portion 225 to guide the airflow from the fan 60 to flow in the accommodating cavity by passing through the outer surface of each air-conditioning membrane 31 of the air-regulating membrane component 30 away from the oxygen-rich gas collecting cavity. The plurality of air guiding ribs may be divided into two sets, namely, a first set of air guiding ribs and a second set of air guiding ribs that are arranged symmetrically with the first set of air guiding ribs about a plane. Each set of the air guiding ribs comprises a first air guiding rib, at least one second air guiding rib, and at least one third air guiding rib. The first air guiding rib extends toward one side of the accommodating cavity from an outlet of the centrifugal fan to a laterally outer side of the air-regulating membrane component 30. Each second air guiding rib is provided between two first air guiding ribs and also located between the air-regulating membrane component 30 and the centrifugal fan. Each of the third air guiding ribs is located on a laterally outer side of the air-regulating membrane component 30 to guide the airflow, so that the airflow may enter the gap between the air-regulating membrane component 30 and the bottom or top surface of the accommodating cavity from two lateral sides of the air-regulating membrane component 30.

In some embodiments of the present invention, a locking device, a handle and a handle positioning device are provided between the drawer body 23 and the drawer cartridge 22. The locking device comprises pivotal latches provided on two sides of the drawer cover, two snap-fit portions provided on the drawer cartridge 22, and a snap facilitating device. Each snap-fit portion may be a projection. The snap facilitating device may be used to facilitate the rotation of the two pivotal latches in a direction for snapping into the respective snap-fit portions (namely, the first direction thereof). The handle extends horizontally and is slidably mounted to the drawer cover in a vertical direction. In addition, when the drawer body 23 is in the closed state, the position of the handle may be the initial position of the handle. In addition, if the handle is configured at the initial position, the two ends of the handle may be respectively in contact with the two pivotal latches to prevent each pivotal latch from rotating in the other direction opposite to the first direction thereof, such that the pivotal latch may be kept in match with the snap-fit portion to lock the drawer body 23 to the drawer cartridge 22. Furthermore, if the handle is moved up or down to a lock release position, that is, the handle is moved from the initial position to the lock release position, each pivotal latch may be allowed to rotate in the other direction opposite to the first direction thereof, so that the pivotal latch may rotate away from the corresponding snap-fit portion when the drawer body 23 is pulled outward, thereby allowing the drawer body 23 to be opened. The handle positioning device is configured to keep the handle at a predetermined position when the handle is move to the position that is mainly the initial position or the lock release position. When the drawer body is opened, the user may firstly move the handle up or down to the lock release position, and the handle positioning device keeps the handle in this position to enable the user to pull the drawer body 23 outward. When the drawer body is closed, the user may firstly close the drawer body 23 and then return the handle down or up to the initial position, and the handle positioning device keeps the handle in the position, so as to keep the drawer body 23 and the drawer cartridge 22 in the locked state.

In order to further smooth the movement of the handle, the two ends of the handle are provided with a guiding rod and a slider, respectively, and the guiding rod extends in the vertical direction. The drawer body 23 further comprises two sets of sliding rails with each set provided with at least three sliding slots that extend in a vertical direction, so that the guide rod may have sliding grooves at two sides thereof, and the slider moves on the remaining sliding groove, or so that the slider may have sliding slots at two sides thereof, and the guiding rod moves on the remaining sliding slot. For example, each set of sliding rails may comprise four sliding slots, wherein the guiding rod may have sliding slots at the front and rear sides thereof, and the slider may have sliding slots at two lateral sides (namely, the left and right sides) thereof.

So far, a person skilled in the art shall know that although a plurality of exemplary embodiments of the present invention have been described above in detail, various variations and improvements can be directly determined or deducted from the content disclosed by the present invention without departing from the spirit and scope of the present invention. Therefore, all those variations and improvements shall be deemed to be covered by the scope of the present invention.

What is claimed is:

1. A refrigerating and freezing device, comprising:
   a cabinet defining a storage space and a compressor chamber, a storage container being provided in the storage space, and the storage container having an air-conditioning and freshness-keeping space;
   an air-regulating membrane component having at least one air-conditioning membrane and one oxygen-rich gas collecting cavity with a surrounding space communicated with the air-conditioning and freshness-keeping space, and which is configured to enable more oxygen than nitrogen in the surrounding space of the air-regulating membrane component to enter into the oxygen-rich gas collecting cavity through the air-conditioning membrane; and
   a suction pump, provided in the compressor chamber, an inlet end of the suction pump being communicated with the oxygen-rich gas collecting cavity of the air-regulating membrane component through a pipeline, so as to pump the gas penetrating into the oxygen-rich gas collecting cavity out the storage container;
   wherein the storage container is a drawer assembly, comprising:
      a drawer cartridge, having a forward opening and provided in the storage space; and
      a drawer body, slidably mounted in the drawer cartridge to be operatively withdrawn from and inserted into the drawer cartridge from the forward opening of the drawer cartridge;
   a plurality of air pressure balancing holes is defined in the drawer cartridge for communicating the storage space and the air-conditioning and freshness-keeping space.

2. The refrigerating and freezing device according to claim 1, wherein an accommodating cavity communicating with the air-conditioning and freshness-keeping space is recessed in a top wall of the drawer cartridge to accommodate the air-regulating membrane component.

3. The refrigerating and freezing device according to claim 2, wherein at least one first vent hole and at least one second vent hole spaced apart from the first vent hole are defined in a wall surface between the accommodating cavity in the top wall of the drawer cartridge and the air-conditioning and freshness-keeping space, so as to respectively communicate the accommodating cavity and the air-conditioning and freshness-keeping space in different positions; and
   the refrigerating and freezing device further comprises a fan provided in the accommodating cavity to drive the air in the air-conditioning and freshness-keeping space to be returned to the air-conditioning and freshness-keeping space sequentially passing through the at least one first vent, the accommodating cavity and the at least one second vent.

4. The refrigerating and freezing device according to claim 1, wherein the compressor chamber extends in a lateral direction of the cabinet, and the suction pump is defined at a lateral end of the compressor chamber.

5. The refrigerating and freezing device according to claim 4, further comprising:
a mounting bottom plate, mounted on a bottom surface of the compressor chamber by a plurality of vibration-damping footpads; and
a sealing case, mounted on the mounting bottom plate, wherein:
the suction pump is mounted in the sealing case.

6. The refrigerating and freezing device according to claim 4, wherein the storage space is a refrigerating space; the cabinet further defines a freezing space provided below the storage space and a temperature changing space provided between the freezing space and the refrigerating space; and
the compressor chamber is provided behind and below the freezing space.

7. The refrigerating and freezing device according to claim 6, wherein the pipeline comprises a vertical pipe section provided behind the storage space.

8. The refrigerating and freezing device according to claim 1, wherein the air-regulating membrane component further comprises a support frame comprising a first surface and a second surface parallel to each other, and the support frame is formed with a plurality of airflow passages that extends on the first surface and the second surface, and that penetrates through the support frame to communicate the first surface and the second surface, the plurality of airflow passages jointly forming the oxygen-rich gas collecting cavity; and the at least one air-conditioning membrane is two planar air-conditioning membranes laid on the first surface and the second surface of the support frame, respectively.

9. A refrigerating and freezing device, comprising:
a cabinet defining a storage space and a compressor chamber, a storage container being provided in the storage space, and the storage container having an air-conditioning and freshness-keeping space;
an air-regulating membrane component having at least one air-conditioning membrane and one oxygen-rich gas collecting cavity with a surrounding space communicated with the air-conditioning and freshness-keeping space, and which is configured to enable more oxygen than nitrogen in the surrounding space of the air-regulating membrane component to enter into the oxygen-rich gas collecting cavity through the air-conditioning membrane; and
a suction pump, provided in the compressor chamber, an inlet end of the suction pump being communicated with the oxygen-rich gas collecting cavity of the air-regulating membrane component through a pipeline, so as to pump the gas penetrating into the oxygen-rich gas collecting cavity out the storage container;
wherein the compressor chamber extends in a lateral direction of the cabinet, and the suction pump is defined at a lateral end of the compressor chamber;
the refrigerating and freezing device further comprises:
a mounting bottom plate, mounted on a bottom surface of the compressor chamber by a plurality of vibration-damping footpads; and
a sealing case, mounted on the mounting bottom plate, wherein:
the suction pump is mounted in the sealing case.

10. A refrigerating and freezing device, comprising:
a cabinet defining a storage space and a compressor chamber, a storage container being provided in the storage space, and the storage container having an air-conditioning and freshness-keeping space;
an air-regulating membrane component having at least one air-conditioning membrane and one oxygen-rich gas collecting cavity with a surrounding space communicated with the air-conditioning and freshness-keeping space, and which is configured to enable more oxygen than nitrogen in the surrounding space of the air-regulating membrane component to enter into the oxygen-rich gas collecting cavity through the air-conditioning membrane; and
a suction pump, provided in the compressor chamber, an inlet end of the suction pump being communicated with the oxygen-rich gas collecting cavity of the air-regulating membrane component through a pipeline, so as to pump the gas penetrating into the oxygen-rich gas collecting cavity out the storage container;
wherein the air-regulating membrane component further comprises a support frame comprising a first surface and a second surface parallel to each other, and the support frame is formed with a plurality of airflow passages that extends on the first surface and the second surface, and that penetrates through the support frame to communicate the first surface and the second surface, the plurality of airflow passages jointly forming the oxygen-rich gas collecting cavity; and
the at least one air-conditioning membrane is two planar air-conditioning membranes laid on the first surface and the second surface of the support frame, respectively.

* * * * *